United States Patent
Nobayashi

(10) Patent No.: US 7,059,738 B1
(45) Date of Patent: Jun. 13, 2006

(54) HANDLE WITH LIGHT FOR WALKING MEMBER

(76) Inventor: Noel Nobayashi, 1516 Cardinal, Melrose Park, IL (US) 60160

( * ) Notice: Subject to any disclaimer, the term of this patent is extended or adjusted under 35 U.S.C. 154(b) by 135 days.

(21) Appl. No.: 10/801,628

(22) Filed: Mar. 16, 2004

(51) Int. Cl.
*A45B 3/02* (2006.01)
(52) U.S. Cl. .................. 362/102; 362/191; 135/66; 135/67
(58) Field of Classification Search ............... 362/253, 362/102, 577, 191, 196; 135/66, 67

See application file for complete search history.

(56) References Cited

U.S. PATENT DOCUMENTS

| | | | | |
|---|---|---|---|---|
| 4,837,666 A | * | 6/1989 | Conkle | 362/102 |
| 5,722,445 A | * | 3/1998 | Hae et al. | 135/65 |
| 5,810,466 A | * | 9/1998 | Young | 362/102 |
| 5,853,219 A | * | 12/1998 | Santuccio | 297/5 |
| 6,508,580 B1 | * | 1/2003 | Collins | 362/570 |
| 2002/0159253 A1 | * | 10/2002 | Datebout et al. | |

* cited by examiner

*Primary Examiner*—Laura Tso
(74) *Attorney, Agent, or Firm*—Robert L. Marsh

(57) ABSTRACT

To illuminate the ground across which one walks with a walking member, such as a cane or a walker, a light is provided in a handle attachable to the walking member. The handle includes a light producing means, a battery, and a switch for turning on and off the light.

5 Claims, 3 Drawing Sheets

US 7,059,738 B1

HANDLE WITH LIGHT FOR WALKING MEMBER

The present application relates to walking members such as canes, walkers, crutches, and strollers and, in particular, to a handle attachable to such walking members, the handle having a light therein.

BACKGROUND OF THE INVENTION

Disabled and infirm people make use of canes, walkers, and crutches to aid in their walking. One making use of a pair of crutches usually has one hand gripping each of the crutches, such that both hands are occupied while the injured person makes use of the crutches. In similar fashion, a walker, which consists of four legs and handles, is customarily gripped by both hands for stability. Baby strollers and the like are also customarily made to be gripped by both hands of an adult pushing the stroller. A cane, on the other hand, is intended to be gripped by one hand. For the purpose of this discussion, all of the forgoing types of devices are hereinafter generally referred to generally as "walking members." Such walking members require the use of at least one hand and in most cases, both hands. When one makes use of such walking members for his or her own stability, one cannot release his or her grip on the handles of the walking member when such devices are in use.

One common problem encountered by disabled and elderly people who make use of walking members is the need to see the ground across which the person is traversing. A person using a walker, cane, or crutches must know if the ground being traversed is uneven in order to avoid stumbling and falling. In many cases, the ambient lighting is insufficient for the user of the walking member to see the contour of the ground across which he is traversing and, therefore, he may stumble and fall even though the person has used his or her best efforts to view the ground. There is therefore a great need for the users of walking members to have a flashlight or other means built into the walking member to illuminate the underlying ground across which one is traversing.

In view of the above, one would expect that it would be common for the manufacturers of walking members to provide products having a light that could be actuated from the handle of the walking member to enable the user to illuminate the underlying ground. There are, in fact, numerous patents which protect various configurations in which lights are attached to canes, walkers, and the like. Not withstanding the need to provide illumination to the users of walking members, to the knowledge of the applicant, there are no walking members currently on the market that are provided with a lighting device operable from the handle of a walking member to illuminate the underlying ground. Presumable, such walking members are relatively inexpensive devices and the manufacturers thereof are not motivated to offer options to their customers of such devices. Regardless of the reasons of the manufacturers and sellers of such devices, walking members having lighting fixtures operable from the handles thereof for illuminating the underlying ground are not available to the public.

Substantially, the same problem exists for the users of baby strollers. Normally, two hands are needed to properly operate a baby stroller. It is desirable for the user of a baby stroller to avoid obstacles and irregular ground across which the stroller is being maneuvered, but nonetheless, baby strollers are typically not fitted with lighting fixtures.

In view of the forgoing, it would be desirable to provide a device, which would be attachable to the hand gripping portion of a walking member for retrofitting the walking member to enable it to illuminate the ground across which the user of the walking member is traversing.

SUMMARY OF THE INVENTION

Briefly, the invention is embodied in a hand grip for fitting around a cylindrical gripping portion of a walking member. The hand grip of the present invention includes a gripping body made out of a suitable material such as rubber or plastic. The body is generally tubular having a cylindrical inner diameter sized to receive the cylindrical portion of the walking member intended to be gripped by the hand. The outer surface of the body is shaped to be gripped by the human hand. Fitted into the body is a light producing means, such as an LED. The body of the gripping member also has a cavity suitable for receiving at least one battery and a switch operable by a finger or a thumb of a user. The switch, LED, and portions of the cavity for receiving a battery are electrically connected such that the user can operate the switch to selectively illuminate the light means, which is oriented to direct light towards the ground across which the user is walking.

BRIEF DESCRIPTION OF THE DRAWINGS

A better understanding of the present invention will be had after reading of the following detailed description taken in conjunction with the drawings, wherein.

DETAILED DESCRIPTION OF PREFERRED EMBODIMENT

Figure 1:
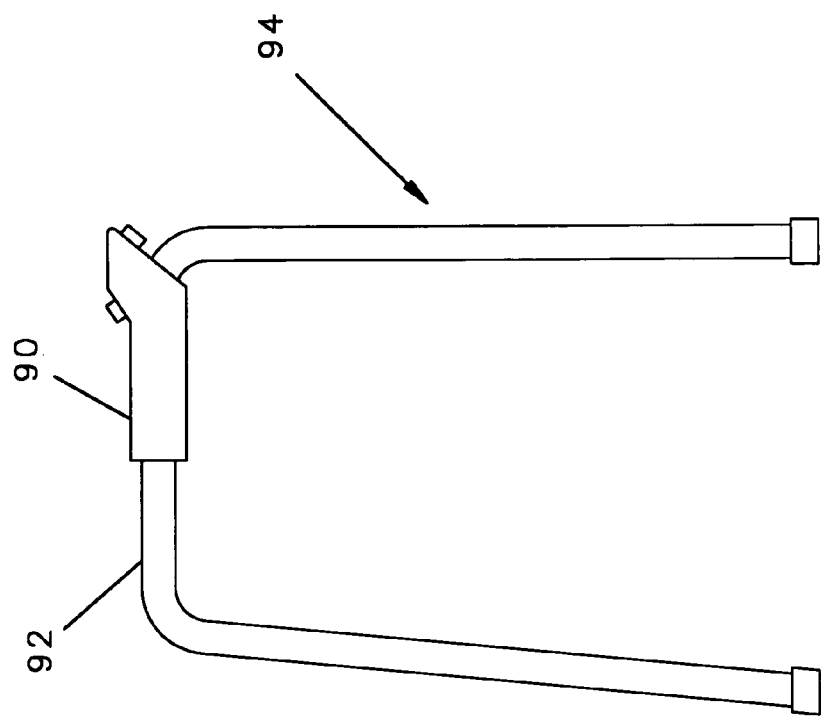
FIG. 1 is a side elevational view of a cane fitted with a hand grip in accordance with the present invention.
Figure 2:
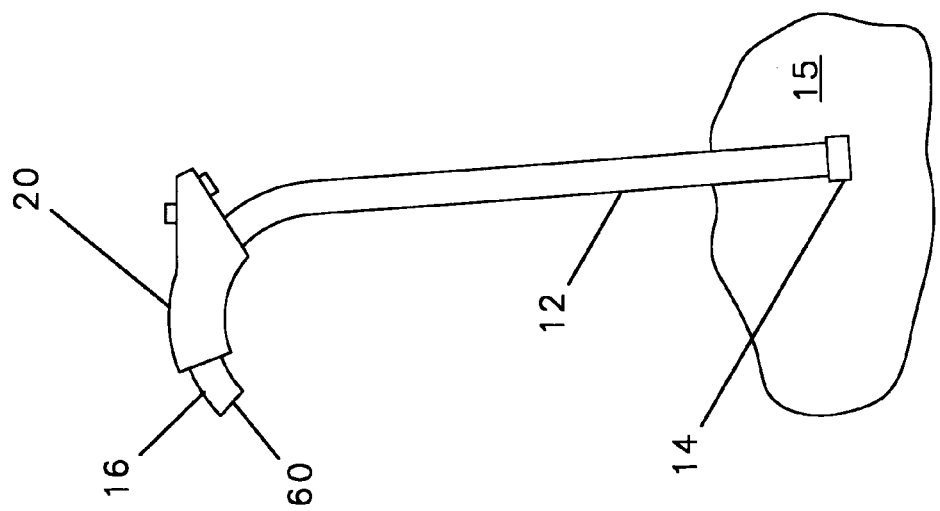
FIG. 2 is a side elevational view of a walker fitted with a hand grip in accordance with the present invention.
Figure 4:
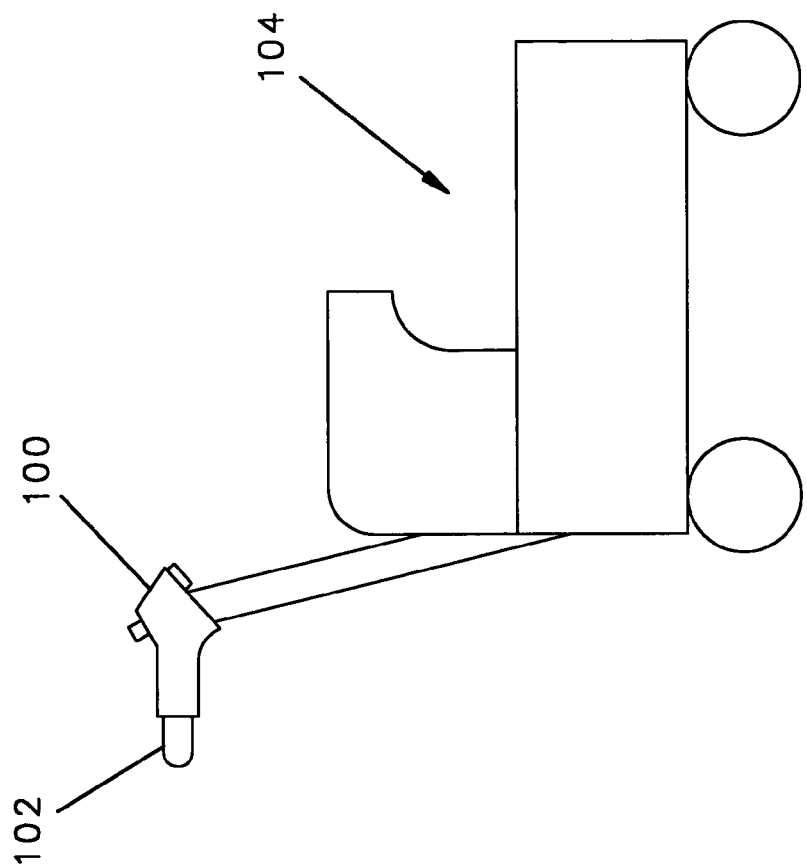
FIG. 4 is a side elevational view of a stroller fitted with a hand grip in accordance with the invention.

Referring to FIG. 1, a cane 10 consists of an elongate cylindrical pedestal 12 having a foot 14 for resting on the underlying ground 15, and at the upper end of the pedestal 12 is a curved handle 16. The body of the cane 10 including the pedestal 12 and the handle 16 may be made of a single piece of wood or metal tubing, such that, for all practical purposes, the elongate pedestal 12 and curved handle 16 have a substantially constant diameter across their entire length. In some cases, the handle 16 of the cane 10 is fitted with a rubberized gripping portion having a contoured shape suitable for being grasped by the human hand.

To employ the present invention on a cane 10 that is fitted with an existing gripping portion around the curved portion of the handle 16, the gripping portion provided by the manufacturer must be removed to expose the underlying curved cylindrical body of the pedestal 12 and handle 16.

Figure 5:
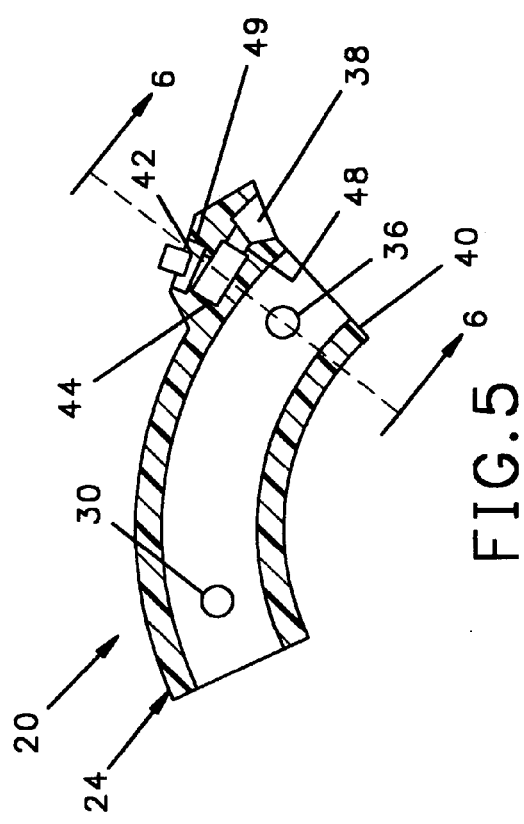
FIG. 5 is an enlarged, cross-sectional view of the hand grip shown in FIG. 1.
Figure 6:
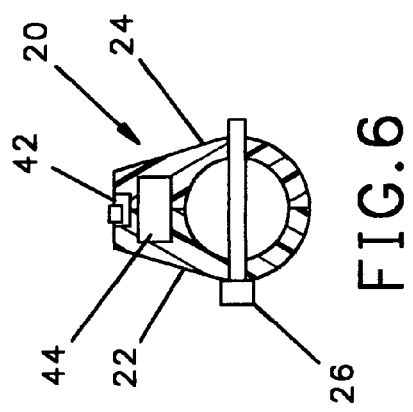
FIG. 6 is a cross sectional view of the hand grip shown in FIGS. 1 and 5 taken through line 6—6 of FIG. 5.

Referring to FIGS. 1, 5, and 6, to enable the user of a walking member, such as the cane 10, to illuminate the ground across which he of she intends to walk, a gripping member 20 in accordance with the present invention is provided. The gripping member 20 has first and second arcuate body members 22, 24 respectively, which are retained to the curved portion of the handle 16 of a cane 10 by means of a pair of screws, one of which 26 is shown, extending through holes, not shown, in the first body member 22, through holes, not shown, in the handle 16 of the cane 10, and into threaded holes 34, 36 in the second body member 24 for retaining the two arcuate halves 22, 24 around the handle 16 of the cane 10.

Embedded into the body of the first body member 22 is a light producing member, such as an LED 38, positioned near one end 40 thereof and directed such that when the LED 38 is illuminated, light emitting from the LED will be directed towards the ground 15 near the foot 14 of the cane 10 when the arcuate body members 22, 24 are attached to the handle 16 of the cane.

Within the arcuate first body member 22 is a switch 42 and a cavity 44 sized to receive a battery, not shown. One contact 48 of the LED 38 is directed to a portion of the cavity 44 for engaging one of the contacts of the battery retained in the cavity 44 and the other contact 49 of the LED 38 is connected to the switch 42. A connecting wire, not shown, joins the second contact of the switch 42 to a second contact of the battery to thereby complete the circuit between the battery, the LED 38, and the switch 42. The body of the first and second members 22, 24, are preferably made of a plastic or a stiff rubber so as to maintain a degree of rigidity.

I have found that battery operable LEDs will generate sufficient light to illuminated the underlying ground while drawing power from a very small battery that can be fitted into a small cavity 44 in one of the body members 22 of a split gripping member 20 as described above. In some cases, the LED 38 may require a cavity suitable for receiving two small batteries of the type generally used in watches, cameras and the like.

The invention may be incorporated into a cylindrical gripping member having a contoured body with a cylindrical bore sized to receive the cylindrical portion of the handle 16 of a cane 10 so that the gripping member may be slipped over one end 60 of the cane 10. In this embodiment, the gripping member is cast as a single member and is secured to the handle 16 of the cane 10 by forcing the tubular handle 16 of the cane into the cylindrical bore of the gripping member.

Figure 3:
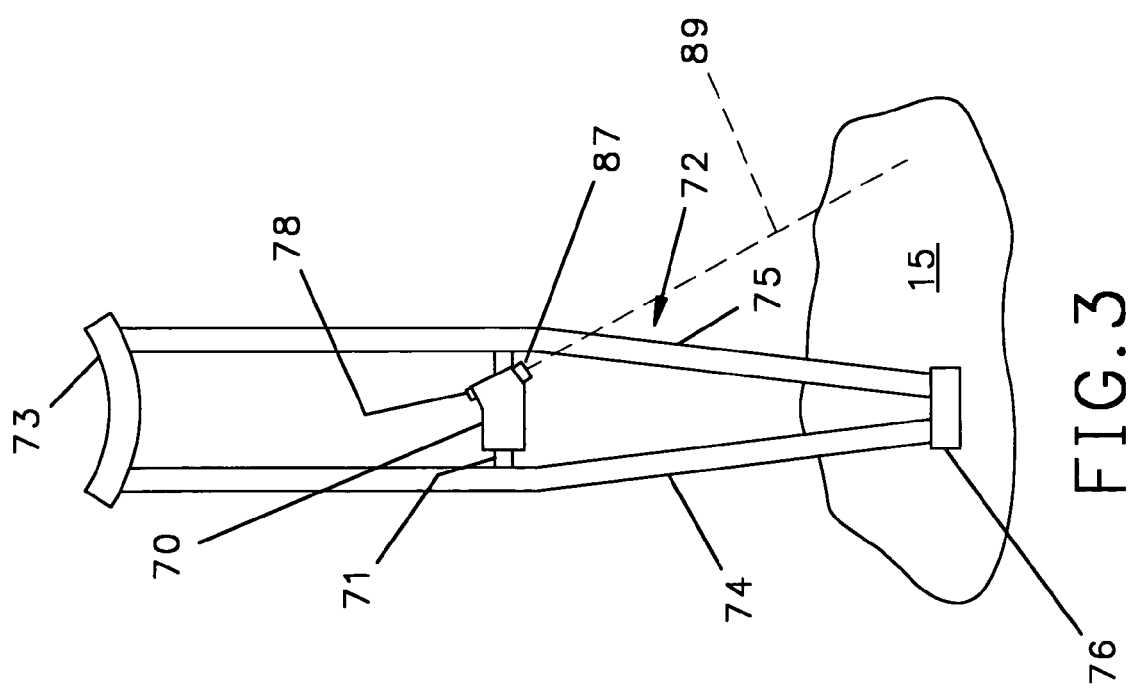
FIG. 3 is a side elevational view of a crutch fitted with a hand grip of the present invention.
Figure 7:
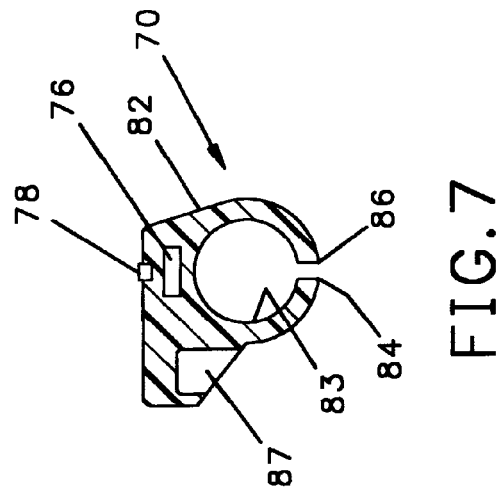
FIG. 7 is an enlarged cross-section view of the hand grip attached to the crutch shown in FIG. 3.

Referring to FIGS. 3 and 7, a gripping member 70 in accordance with the present invention may be attached to the handle 71 of crutch 72. Crutch 72 a curved upper end 73 for fitting under the arm of a patient and a pair of downwardly extending legs 74, 75 that converge at a foot 76. The handle 71 extends between midpoints in the length of the legs 74, 75.

The body of the gripping member 70 for use with the crutch 72 may be made by assembling two mated parts 22, 24 as described above, or may be made with a single piece body 82 of a semi-flexible material, such as a relatively rigid rubber or the like. Body 82 is generally configured as a cylinder having a longitudinal cylindrical inner aperture 83 with an elongate slice through the body 72 forming abutting surfaces 84, 86. The surfaces 84, 86 may be separated to enable the gripping member 70 to be fitted around a cylindrical handle 71 of crutch 72 after which the spring qualities of the material of which the body 82 is made will urge the surfaces 84, 86 toward each other and be compressed around the handle 71 to thereby retain the desired orientation of the body 82 with respect to the handle 71.

Within the body 82 is cavity 76 for retaining a battery, a switch 78, and an LED 87 to illuminate the ground. In this embodiment an LED 87 is mounted offset with respect to the cylindrical aperture 83 so that the beam 89 of the LED 87 will be directed to illuminate the ground 15 near the foot 76 without being blocked by the forward leg 75.

Referring to FIGS. 1, 2, 3 and 4, in all embodiments of the invention, the gripping member 20, 70, 90, 100 includes a body, such as body members 22, 24 or body member 72, and means for assembling the body member around a tubular handle of a walking member, such as screws 26 or the semi-flexible material with a memory such as the rubber material described above. The gripping members 20, 70, 90, 100 are shown attachable to the handle 16 of cane 10, the handle 71 of crutch 72, the handle 92 of walker 94, the handle 102 of baby stroller 104 respectively, but a gripping member in accordance with the invention may be attached to any other type of walking member. The gripping member includes a light producing means 38, 87, a switch 42, and a cavity 44 within the body for receiving a battery, and the associated electrical connections. Accordingly, an existing cane 10, crutch 72, walker 94 or stroller 104 can be retrofitted with a light producing gripping member 20, 70, 90, 100 in accordance with the present invention, by removing any existing handle and thereafter assembling the gripping member of the present invention around the cylindrical gripping portion of the walking member.

While the invention has been described with respect to three embodiments, it will be appreciated that many modifications and variations may be made without departing from the true spirit and scope of the invention. It is therefore the intent of the appended claims to cover all such modifications and variations which fall within the true spirit and scope of the invention.

What is claimed is:

1. A member for attachment to a walking member for providing illumination to the ground across which said walking member is to be moved, said walking member having a cylindrical handle intended to be gripped by the human hand, said member comprising a body including a gripping portion configured to be gripped by a human hand, said body having an inner surface, and an open end sized to fit over said handle of said walking member gripped by a user of said walking member to control said walking member while said open end is fitted over said handle of said walking member, a light producing means for producing a beam of light, said light producing means fitted on said body, means for retaining a battery in a portion of said body, means for attaching said body around said cylindrical handle of said walking member, and said light producing means mounted on said body to direct said beam of light toward said ground across which said walking member is moveable while said body is fitted around said handle of said walking member.

2. The member of claim 1 and further comprising a switch for turning said light producing means on and off.

3. The member of claim 1 wherein said body is a tubular member.

4. A member for attachment to a walking member for providing illumination to the ground across which said walking member is to be moved, said walking member having a cylindrical handle intended to be gripped by the human hand, said member comprising a body including a gripping portion configured to be gripped by a human hand, said body having an inner surface, and an open end, said body having a first body portion and a second body portion wherein said first and second body portions may be assembled around said cylindrical handle of said walking member, a light producing means for producing a beam of light, said light producing means fitted on said body, means for retaining a battery in a portion of said body, means for attaching said body around said cylindrical handle of said walking member, and said light producing means mounted on said body to direct said beam of light toward said ground across which said walking member is moveable while said body portions are assembled around said cylindrical handle of said walking member.

5. A member for attachment to a walking member for providing illumination to the ground across which said walking member is to be moved, said walking member having a cylindrical handle intended to be gripped by the human hand, said member comprising a body configured to be gripped by a human hand, said body having an inner surface, and an open end, said body is made of a semi-flexible material with a memory, said body being tubular with an elongate slit running the length of tubular body forming surfaces that may be separated from each other to position said body around said handle of said walking member, a light producing means for producing a beam of light, said light producing means fitted on said body, means for retaining a battery in a portion of said body, means for attaching said body around said cylindrical handle of said walking member, means for attaching said body around said cylindrical handle of said walking member, and said light producing means mounted on said body to direct said beam of light toward said ground across which said walking member is moveable while said tubular body is positioned around said cylindrical handle of said walking member.

* * * * *